United States Patent
Wode

(10) Patent No.: US 6,802,112 B2
(45) Date of Patent: Oct. 12, 2004

(54) METHOD FOR MAKING A PRESSURE-TIGHT ATTACHMENT OF AN ELASTOMERIC TUBULAR PIECE TO A CONNECTING PART

(75) Inventor: Stefan Wode, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 55 days.

(21) Appl. No.: 09/986,887

(22) Filed: Nov. 13, 2001

(65) Prior Publication Data

US 2002/0056182 A1 May 16, 2002

(30) Foreign Application Priority Data

Nov. 15, 2000 (DE) .......................................... 100 56 571

(51) Int. Cl.[7] .............................................. B23Q 17/00
(52) U.S. Cl. ..................... 29/407.05; 72/30.1; 285/382; 29/516; 29/715
(58) Field of Search ......................... 29/407.05, 407.08, 29/516, 715, 720; 285/382; 72/30.1, 31.1, 37

(56) References Cited

U.S. PATENT DOCUMENTS

| | | | | |
|---|---|---|---|---|
| 4,569,126 A | * | 2/1986 | Weber ........................ | 29/707 |
| 4,953,383 A | * | 9/1990 | Stiver et al. .................. | 72/402 |
| RE33,714 E | * | 10/1991 | Anderson et al. ............. | 72/410 |
| 5,150,519 A | * | 9/1992 | Unewisse ................ | 29/890.14 |
| 5,490,406 A | * | 2/1996 | College ...................... | 72/30.1 |
| 5,799,383 A | * | 9/1998 | Baldwin et al. ......... | 29/407.05 |
| 6,218,814 B1 | * | 4/2001 | Kohl et al. ................... | 322/28 |

FOREIGN PATENT DOCUMENTS

| | | |
|---|---|---|
| DE | 298 06 179 | 10/1998 |
| EP | 0548627 | 6/1993 |
| EP | 0 548 627 | 5/1995 |
| WO | WO 01/09541 | 2/2001 |

\* cited by examiner

Primary Examiner—David P. Bryant
Assistant Examiner—Stephen Kenny
(74) Attorney, Agent, or Firm—Walter Ottesen

(57) ABSTRACT

The invention is directed to a method for making a pressure-tight attachment of an elastomeric tubular piece to an attachment part. For making the pressure-tight attachment, an open end of a tubular piece made of elastomeric material is pushed onto a connecting part and a metal clamping ring is positioned thereon. While radially pressing the jaws of the clamping device together, the diameter of the clamping ring is reduced and the tubular piece is thereby tightly clamped to the connecting part. The clamping operation is ended before damage occurs but only when an adequate strength is ensured. During clamping, the force/displacement curve is observed and a characteristic feature of the measured curve is used as a basis of computation for a switchoff criterion. Preferably, the clamping operation is only ended when the clamping force begins to drop for the first time after the maximum force is exceeded in a defined manner in a predetermined localized or bounded curve segment. The method of the invention is especially for attaching a resilient member to a cover and/or to a roll-off piston of an air spring of a motor vehicle.

8 Claims, 1 Drawing Sheet

METHOD FOR MAKING A PRESSURE-TIGHT ATTACHMENT OF AN ELASTOMERIC TUBULAR PIECE TO A CONNECTING PART

BACKGROUND OF THE INVENTION

European patent publication 0,548,627 discloses a method for pressure-tightly connecting a tubular piece to a connecting part. The tubular pieces to be attached are especially in the form of resilient members for motor vehicle air springs. The pressure-tight attachment of such resilient members to cover plates and/or roll-off pistons takes place with metal clamping rings which can be radially pressed.

Arrangements for pressure-tightly attaching a resilient member to a connecting part are disclosed in U.S. Pat. No. 4,471,520 and European Patent 0,548,627. A component, which comprises radially displaceable segments arranged to have a ring shape, is placed about the receiving longitudinal axis of the clamping device.

To attach a resilient member to a connecting part, the resilient member is pushed onto the connecting part and is provided with a clamping ring and is introduced axially into the center receptacle of the clamping device. A force, which acts from the outside on the radially displaceable segments, leads to a reduction of the central opening between the clamping jaws which accommodate the resilient member arrangement and, with increasing narrowing contact with the resilient member arrangement, this force leads to a plastic deformation of the clamping ring whereby the previously pushed on end of the resilient member is tightly clamped to the connecting part.

The termination of the clamping operation can be controlled as set forth below.

According to a first procedure, the termination is controlled by a pure limiting of the displacement. Because of manufacturing tolerances in the clamping ring and/or the wall of the resilient member, no reproducible and therefore no satisfactory attachment quality can be achieved with a pure displacement limitation. This is so because the different dimensions lead to a differently intense pressure of the "clamping ring/resilient member end" for a purely displacement limitation. On the one hand, this can lead to damage of the mechanically sensitive resilient member for too high a contact pressure and, on the other hand, leads to a clamping of the tubular resilient member which is not adequately friction tight when the contact pressure is too low.

According to a second procedure, the termination of the clamping operation can be controlled by limiting the axial contact pressure. Here, the clamping operation is interrupted when a pregiven contact force is reached. Geometric manufacturing tolerances can be compensated in this manner. The disadvantage of such a force-controlled clamping operation is that force tolerances can develop in the clamping device and that the force, which is generated by the press tool, is therefore not in a clear relationship to that particular force which develops between the tubular resilient member and the connecting part.

Still more important is the fact that fluctuations of the clamping ring hardness have a direct effect on the clamping result.

SUMMARY OF THE INVENTION

The method of the invention is for force-tightly attaching a tubular piece made of elastomeric material to a connecting part. The method includes the steps of: pushing an open end of the tubular piece onto the connecting part; positioning a metal clamping ring around the tubular piece at the pushed on end region thereof; radially applying a clamping force to the clamping ring to reduce the diameter of the clamping ring and thereby tightly clamping the tubular piece on the connecting part; detecting the radial force developed during the clamping operation between the clamping ring and the tubular piece; observing and measuring a force/displacement curve during the clamping operation; and, utilizing a characteristic feature of the force/displacement curve as a basis for a criterion for switching off the application of the clamping force, The task solved by the invention thus is that the clamping of the end of the tubular piece to a connecting part by a plastically deformable clamping ring is terminated at the correct time, that is, before damage occurs but only when a sufficient strength is ensured.

For the pressure-tight attachment of the tubular piece made of elastomeric material, the end of the tubular piece is pushed onto the connecting part in the conventional manner. Then, a metal clamping ring is positioned on the end region of the combination "end of the tubular member/connecting part". Thereafter, and with the aid of a clamping device (for example, of conventional type), the central opening, and therefore the inserted plastically deformable clamping ring, is reduced in size by a radial pressing together of the clamping jaws so that the end of the tubular member is pressure tight and mechanically tightly clamped to the connecting part. At the same time, the radial force which is developed is measured during the clamping operation or a force is measured which is in direct relationship to the radial force.

According to the invention, the force/displacement curve is followed during the clamping operation and a characteristic feature of the measured force/displacement curve is utilized as a computational basis for a switchoff criterion. Maxima and turning points of the force/displacement curve can be viewed as switchoff criteria. Here, a defined plastic deformation of the connecting part (air spring cover and/or air spring piston) is deliberately accepted.

Preferably, the clamping operation is only ended when the clamping force begins to drop off for the first time after a defined maximum has been exceeded. It has been shown that, in this way, a very tight clamping is achieved without damaging the end of the tubular member.

The force which acts on the clamping ring can deviate from the primarily developed force because of the lost force vanishing in the mechanics of the clamping device. For this reason, it is advisable, after the clamping, to check whether the obtained parameters (force/displacement) lie within defined tolerance bands.

Accordingly, an optimal clamping is ensured when a plastic deformable piston or cover material is used whose failure or break elongation is not exceeded with the method.

With the aid of the method of the invention, the clamping becomes more cost effective because cost-effective computers can be utilized in the manufacture. However, it is not only with reference to the manufacturing equipment wherein a savings potential is realized but also with the ancillary parts.

The clamping can be maximally exploited. In this way, for example, a thin walled material can be used for the production of air springs. Furthermore, parts having high tolerances with respect to hardness and thickness can nonetheless be reliably clamped. A material-specific optimization of the clamping connection is also possible without knowledge of the individual material characteristics. Furthermore, the clamping is more reliable and less waste is produced.

The method of the invention for pressure-tightly attaching a tubular piece is not only applicable to air springs for attaching a resilient member (tubular piece) to a cover and/or to a roll-poll-off piston. Tube ends can also be mounted pressure tight on various connecting parts in the area of hydraulics.

BRIEF DESCRIPTION OF THE DRAWING

The invention will now be described with reference to the single figure (FIG. 1) of the drawing which shows a force/displacement diagram. The diagram is a plot showing how the force varies as a function of displacement during the clamping of an air spring clamping ring.

DESCRIPTION OF THE PREFERRED EMBODIMENTS OF THE INVENTION

Figure 1:
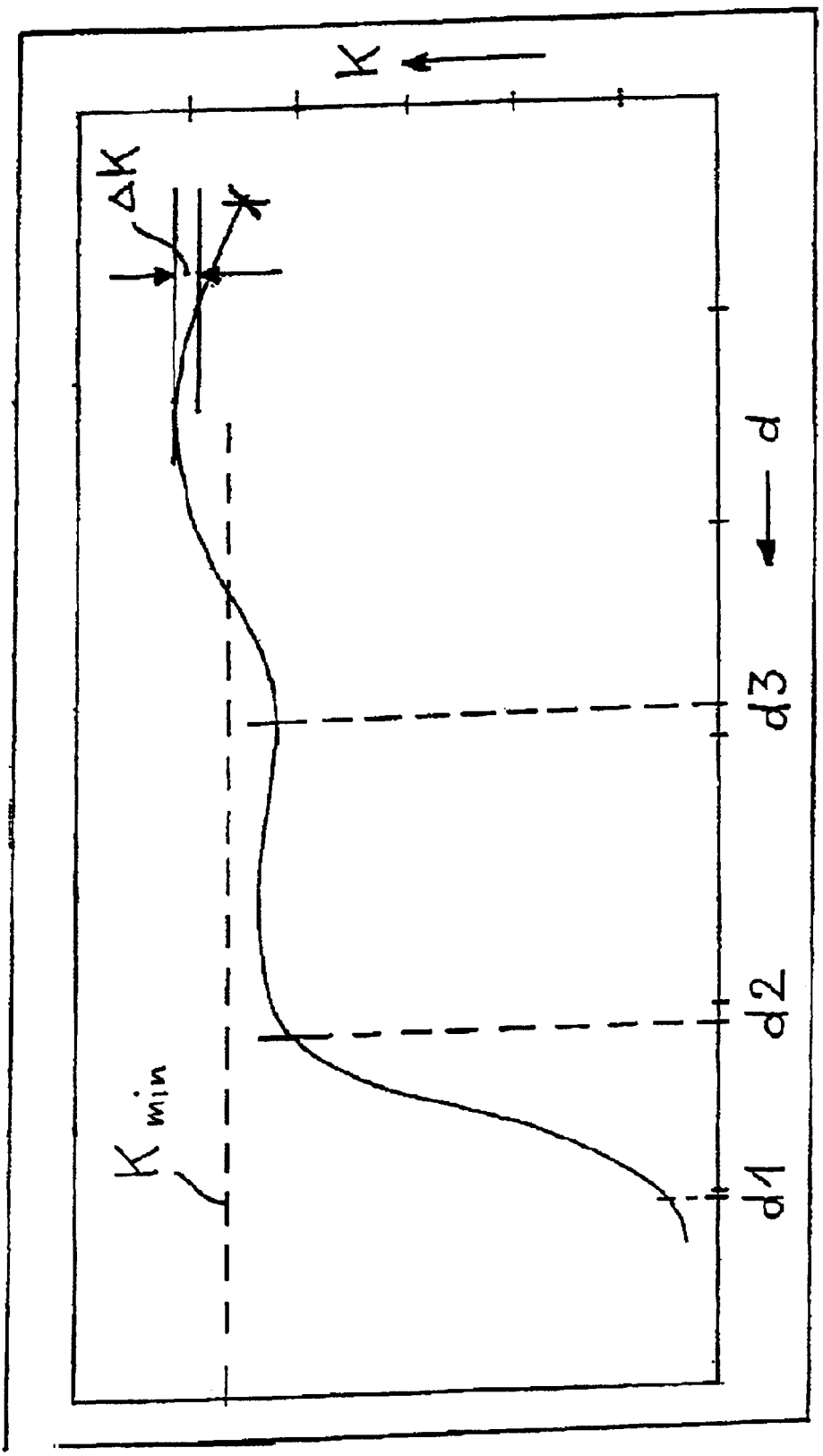

FIG. 1 shows the clamping force K of the clamping device plotted as a function of the diameter (d) between the clamping jaws of the clamping device. This force/displacement characteristic line is detected with the aid of a force sensor and a displacement sensor. The clamping jaws first pass through an air gap and only the more or less constant sliding friction is to be overcome (not shown). When the clamping jaws come into contact with the clamping ring (d1), the force/displacement curve climbs in correspondence to the hardness of the clamping ring (d1 to d2). The clamping ring is elastically deformed. With a further pressing together of the clamping jaws (d2 to d3), a plastic deformation of the clamping ring takes place. The force, which is to be developed at this stage of the pressing operation, is given by the sum of the inner friction of the press tool (dependent upon the position of the force sensor) and the force, which is needed for the plastic deformation of the clamping ring, which is substantially constant.

Driving the clamping jaws farther together leads to a further plastic deformation of the clamping ring and to a force between the tubular resilient member and the connecting part (cover or roll-off piston). A deformation of the connecting part also takes place here which can be seen from an increase of the force/displacement curve (starting at d3). In this range, the increase of the force/displacement curve is substantially dependent upon the stiffness of the connecting part.

According to the invention, this straight-line ascending region is exceeded and reaches a maximum of the force whereafter the force, which is to be developed, again slightly drops. The maximum of the curve is only evaluated when an additional criterion (K>$K_{min}$ or d<d3) is satisfied; that is, another local maximum (for example at d1) should not be evaluated. This local maximum is dependent upon the type of machine used or the location of the farce sensor. According to the invention, a ΔK is postulated as a switchoff criterion; that is, if the force drops by ΔK, then the clamping operation is ended. A further continuation of the clamping operation would result in a destruction of the clamping part at point X.

It is understood that the foregoing description is that of the preferred embodiments of the invention and that various changes and modifications may be made thereto without departing from the spirit and scope of the invention as defined in the appended claims.

What is claimed is:

1. A method for force-tightly attaching a tubular piece made of elastomeric material to a connecting part, the method comprising the steps of:

pushing an open end of said tubular piece onto said connecting part so that a pushed on end region of said tubular piece is on said connecting part;

positioning a metal clamping ring around said tubular piece at the pushed on end region thereof;

radially applying a clamping force (K) during a clamping operation to said clamping ring to reduce the diameter of said clamping ring and thereby tightly clamping said tubular piece on said connecting part;

detecting the radial clamping force developed during the clamping operation between said clamping ring and said tubular piece;

observing and measuring a force/displacement curve during said clamping operation; and, utilizing a characteristic feature of maid force/displacement curve as a basis for a criterion for switching off the application of said clamping force.

2. The method of claim 1, wherein said tubular piece is a resilient member of an air spring and said connecting part is a cover or a piston of an air spring.

3. The method of claim 1, comprising the further step of ending said clamping operation only when said clamping force begins to drop for the first time after a defined maximum of said curve has been exceeded.

4. The method of claim 1, wherein said clamping force is radially applied to said clamping ring with clamping jaws having a diameter (d) therebetween corresponding to said diameter of said clamping ring; said force/displacement curve is a plot of said clamping force (K) as a function of said diameter (d) measured along an abscissa; said force/displacement curve includes a segment during which a plastic deformation of said clamping ring takes place as said diameter (d) is reduced from a diameter (d2) to a diameter (d3) and, after said diameter (d3), said clamping force (K) is increased and causes a deformation also of said connecting part as said diameter (d) is further reduced beyond said diameter (d3) whereupon a maximum value of said clamping force (K) greater than a value $K_{min}$ thereof is reached corresponding to a maximum of said curve; and, the maximum of said curve is only used for evaluation when K>$K_{min}$ and/or d<d3 is satisfied as an additional criterion.

5. The method of claim 4, wherein said maximum of said curve defines a turning point whereat the shape of said curve changes from positive slope to negative slope; and, said turning point of said force/displacement curve is used as a switchoff criterion so that said application of said clamping force is switched off after said clamping force falls off from said maximum by a predetermined increment (ΔK).

6. The method of claim 1, comprising the further step of, after the clamping operation, making a determination as to whether the obtained parameter (force/displacement) lies within a defined tolerance band.

7. The method of claim 1, comprising the further step of using a plastic deformable material for said connecting part having a failure elongation which is not exceeded while performing the steps of the method.

8. The method of claim 1, wherein said clamping force is radially applied to maid clamping ring with clamping jaws having a diameter (d) therebetween corresponding to said diameter of said clamping ring; and, said force/displacement curve is a plot of said clamping force (K) as a function of said diameter (d) measured along an abscissa.

* * * * *

UNITED STATES PATENT AND TRADEMARK OFFICE
CERTIFICATE OF CORRECTION

PATENT NO. : 6,802,112 B2
DATED : October 12, 2004
INVENTOR(S) : Stefan Wode

It is certified that error appears in the above-identified patent and that said Letters Patent is hereby corrected as shown below:

Column 3,
Line 13, delete "force," and insert -- force. -- therefor. --

Column 2,
Line 53, delete "farce" and substitute -- force -- therefor.

Column 4,
Lines 16 and 61, delete "maid" and insert -- said -- therefor.

Signed and Sealed this

First Day of February, 2005

JON W. DUDAS
*Director of the United States Patent and Trademark Office*